Sept. 21, 1926.  
J. B. JARMIN  
ROAD SCRAPER  
Filed May 23, 1925

Inventor  
James B. Jarmin

By Herbert E. Smith  
Attorney

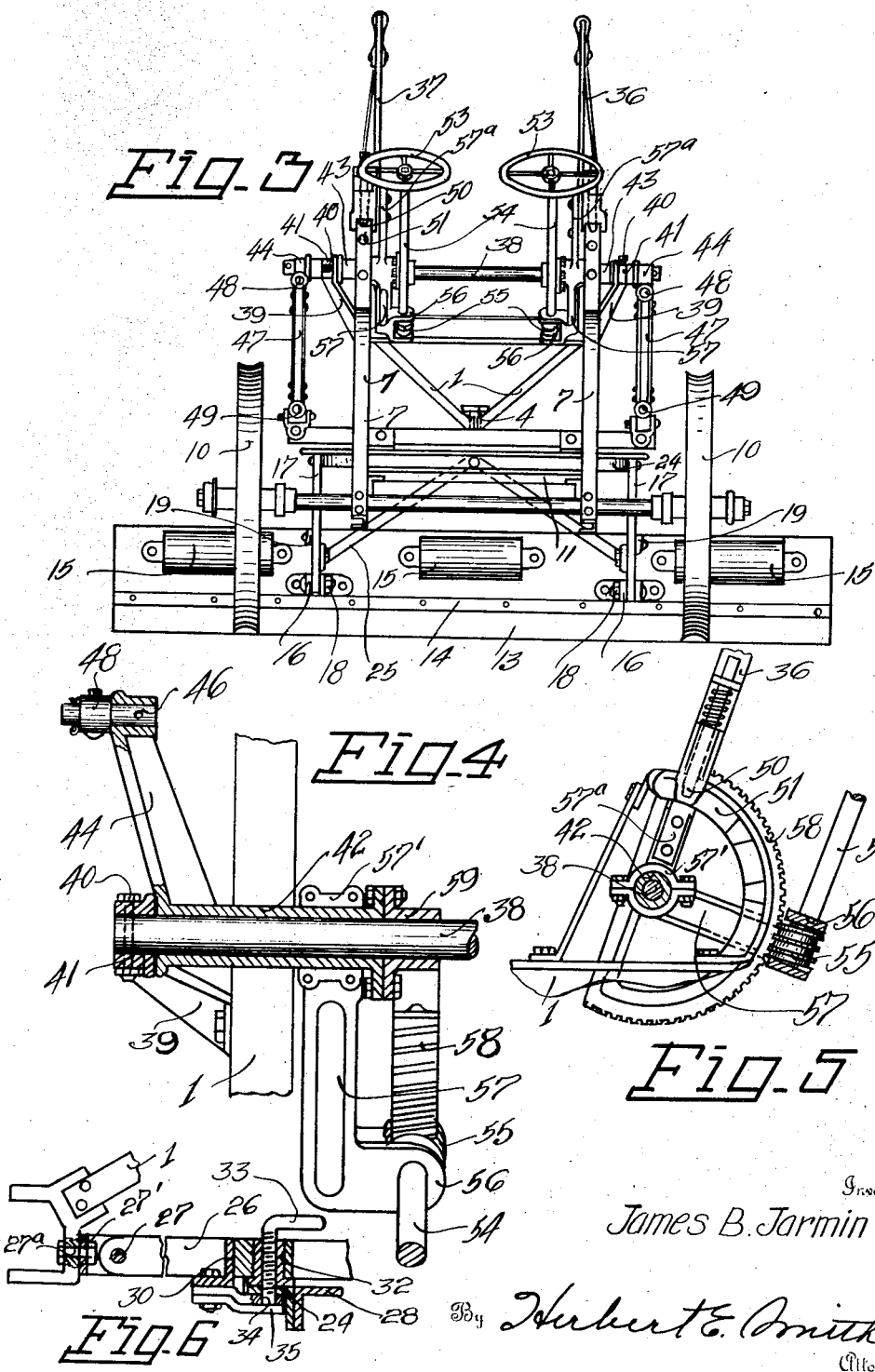

Patented Sept. 21, 1926.

1,600,336

UNITED STATES PATENT OFFICE.

JAMES B. JARMIN, OF MINNEAPOLIS, MINNESOTA.

ROAD SCRAPER.

Application filed May 23, 1925. Serial No. 32,320.

My present invention relates to improvements in road scrapers of the type embodying a transversely arranged and vertically adjustable scraper blade or mold board carried by a wheeled implement, which implement may be horse drawn or propelled by mechanical power, although as herein shown the implement is adapted for horse power.

The invention contemplates a machine of this type in which the transversely arranged scraper blade may be tilted laterally, adjusted angularly to the direction of travel, and adjusted vertically with relation to the road surface for its work, or lifted to inoperative position when not required for use, as during transportation of the implement from road section to another section.

Selective, manually operated means are provided whereby either a quick elevation and lowering of the blade may be accomplished, as for instance in avoiding stumps, large boulders and other obstructions that cannot be cut down, or the blade may be closely and accurately adjusted to working position with relation to the surface to be graded or scraped. Means involving the use of weights on the scraper blade are utilized for retaining the scraper blade in working position and preventing the blade from jumping over irregularities in the road thus eliminating transmission of strains to the frame of the machine.

By the use of the implement of my invention the parts are compactly arranged for ready access and control by the operator or driver, and the parts may with facility be manipulated during the progress of the grading work as required.

The invention consists in certain novel combinations and arrangements of parts as will hereinafter be more fully pointed out and claimed. In the accompanying drawings I have illustrated one complete example of the physical embodiment of my invention wherein the parts are combined and arranged in accordance with the best mode I have thus far devised for the practical application of the principles of my invention, but it will be understood that changes and alterations may be made therein within the scope of my appended claims without departing from the principles of my invention.

Figure 3 is a rear elevation of the implement.

Figure 4 is an enlarged detail sectional view showing one of the complementary lever mechanisms for vertical adjustment of the blade.

Figure 5 is a detail view showing the relation of the lever and hand-wheel mechanism for vertically adjusting the blade.

Figure 6 is a detail showing the locking device for holding the scraper blade in adjusted and fixed position.

Figure 1:
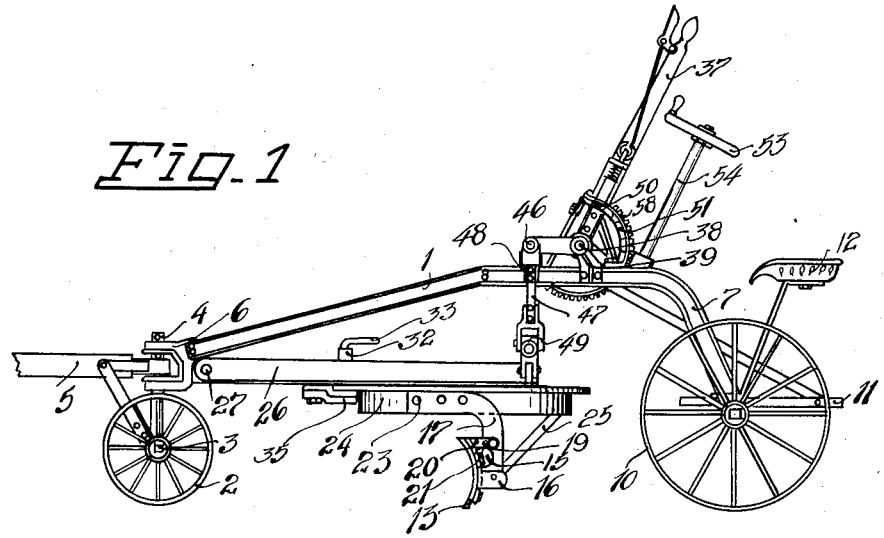
Figure 1 is a view in side elevation of an implement embodying my invention with the scraper blade in working position.

In carrying out my invention I preferably use a main frame 1 of arched shape and preferably with converging front side bars, and utilize a pony truck for steering or guiding which comprises a pair of wheels 2, 2 on the axle 3, and the king pin 4, together with the draft tongue 5 to which the horse power may be hitched.

A bearing head 6 on the front end of the frame is supported on the king pin 4 and located above the steering wheels 2 and the arched frame 1 has its rear ends 7 spaced apart and parallel as seen in Figure 3 and bolted or otherwise secured to the rear axle 9 having the usual spaced wheels 10.

A platform 11 is located at the rear of the implement and the driver or operator occupies a seat 12 located in position so that the operating parts of the machine are readily accessible for the driver.

Figure 2:
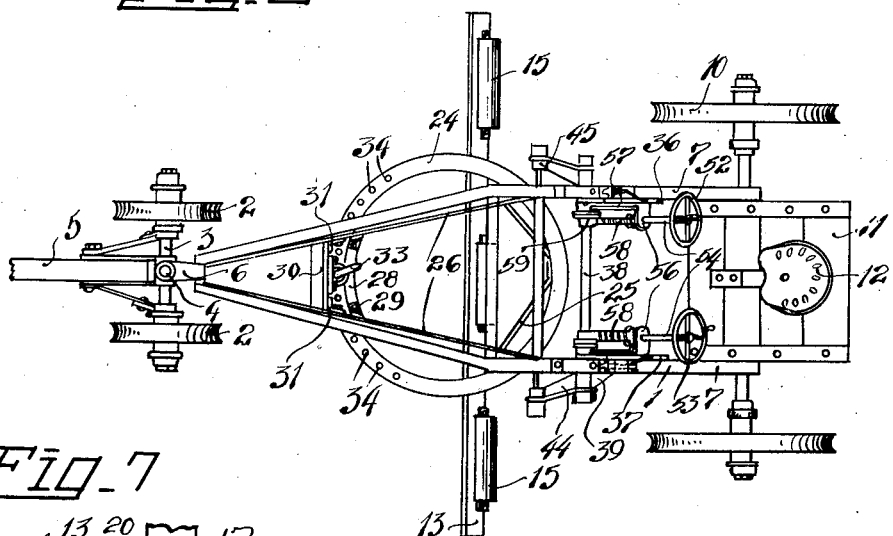
Figure 2 is a top plan view of the implement of Figure 1.
Figure 7:
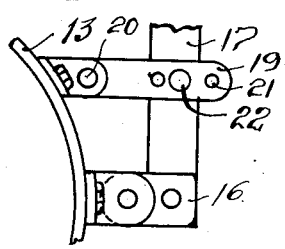
Figure 7 is a detail of the supporting means for the scraper blade.

The scraper blade 13, which as seen in Figures 1 and 2 is located beneath the main frame and positioned at the approximate longitudinal center of the distance between the front and rear wheels where it is subjected to a minimum up-and-down movement due to irregularities of the road under the front and rear wheels respectively. The blade is made up of suitable material and preferably concavo-convex in cross section with a reinforcing strip or plate 14 bolted on its rear face.

To assist in holding the transversely disposed scraper blade to its work and prevent jumping of the blade as it encounters obstacles or irregularities in the road surface, one or more weights 15 are attached in suitable manner, preferably at the rear side of the blade.

At equidistant points from its longitudinal center the scraper blade is provided with a pair of brackets 16 on its rear face to which the lower ends of a pair of angular arms 17 are bolted as at 18. The lower ends of these angular arms extend vertically up from the brackets, and near the top edge of the scraper blade the arms are connected with the blade by means of brace links 19 which are pivoted at 20 at the rear of the blade and provided with selective bolt holes 21. Bolts 22 are passed through a selected hole 21 and through a hole in the angular arm for bracing the blade in desired adjusted position.

The horizontally disposed ends of the angle arms 17 are bolted or riveted as at 23 at diametrically opposite points to a horizontally disposed flanged ring or circular frame 24, preferably made of angle iron and suitably fashioned. The angular arms and the circular frame are rigidly joined by diagonal braces 25 to form a stable supporting frame for the scraper bar, and this scraper frame is supported from a suspending frame 26 which is made up of converging angle bars as seen in Figures 1 and 2, located above the scraper frame, and beneath the main arched frame of the implement.

The suspending frame is pivoted at 27 on a horizontal bolt in the swivel head 27', and this swivel head is coupled to the bearing head 6 by means of a longitudinally extending horizontal bolt 27ª as best seen in Figure 6.

The V-shaped suspending frame is provided with an arcuate transverse guide plate 28 attached by brackets and bolts 29 to the bars of the frame and this guide plate is located within the inner perimeter of the circular scraper frame or ring 24 at the front thereof for contact with the flanged ring. Forward of the arcuate guide plate 28 and located at the outer side of the ring is a cross bar or brace 30 fastened to the respective bars of the suspending frame by means of angle plates 31 and bolts for fastening these parts together.

A locking head 32 is located on the longitudinal center line of the suspending frame and attached to the cross bar in suitable manner, and by means of the locking bolt 33 the ring is connected to the suspending frame. A series of spaced bolt holes 34 are provided in the flanged ring for the bolt 33 and the latter is passed through a selected bolt hole of this series and through the locking head. Beneath the locking head and under the V-shaped suspending frame a guide plate 35 is arranged and adapted to co-act with the plate 28 to relieve the locking pin of excessive strains when the scraper is being used.

The ring or circular frame with its scraper blade may be turned to set the blade at a desired angle with relation to the direction of travel of the implement and then the locking pin is used to lock the suspending frame and scraper frame together through a selected bolt hole 34, to prevent lateral swing of the scraper blade.

The V-shaped suspending frame and its scraper may be adjusted vertically on the pivot 27 either to elevate the scraper blade out of operative or working position by a quick action, or by a slower action to adjust the blade to the surface of the road being graded.

For this purpose I employ duplicate lever actuating mechanism for the quick movement and duplicate hand wheel and screw mechanism for the close adjustment of the scraper blade, the selective lever and screw devices actuating the same elevating devices at opposite sides of the implement.

For the quick acting adjusting mechanism I employ a pair of hand levers 36 and 37 which are supported on and pivotally movable about the center of a fixed transverse bar 38 which is rigidly supported above the main frame by means of end brackets 39, 39, attached to the main frame. These brackets are secured at the opposite ends of the bar by means of bolts 40 passed through perforated collars 41 of the brackets and bolt holes in the ends of the bar, as best seen in Figure 4.

The pivot ends of the levers are each adapted to swing about a bushing as 42 and 43 carried at the ends of the bar 38, and these bushings also are adapted to rock on the bar. Each bushing has an integral crank arm as 44 and 45 at the opposite ends of the bar extending obliquely toward the front of the implement, and these crank arms are connected to a transverse suspending pin 46 parallel with and in front of the fixed supporting bar 38. From the opposite ends of the suspending pins depend a pair of suspending links 47 pivotally connected on the rod by means of a shackle 48, and at their lower ends these links are pivotally connected by a similar shackle 49 to the suspending frame 26. By swinging the levers the links will lift the scraper from the road through the suspending frame which is pivoted at 27 on the main frame or bearing head 6. By means of the usual pawl 50 and rack 51 for each lever they may be retained in adjusted position.

For adjusting the scraper blade to the surface of the roadway I employ a pair of hand wheels 52 and 53 each having a shaft 54 and worm 55 thereon. The shafts are journaled in bearings 56 on bracket arms 57 and each of these arms has a hub 57' loose on the bushings 42 and 43. The hubs are sectional or split members and their members are bolted together by cap screws in usual manner. The levers 36 and 37 are connected to these respective hubs by means of integral arms 57ᵃ so that as the levers are turned the hubs rock with the bushings 42 and 43.

As will be seen in Figure 4 the crank arm 44 is diametrically opposed to the bracket arm 57 and these arms are of substantially the same length.

The worm screw 55 engages a segmental worm gear 58 which has a flanged hub 59 on the bar 38 and is bolted to the flanged bushing 42. Thus it will be apparent that the hand wheels 52 and 53 operate complementary lever mechanism for adjusting the two ends of the scraper blade.

With the grader in working position as shown in Figure 1 for a quick elevation of the scraper blade, the operator can pull back on the levers 36 and 37 which are rigid with the hubs 57' and bracket arms 57 and movement of the arms will be transmitted through the screw 55, gear 58 and hub 59 to the bushing 42 for swinging upwardly the crank arms 44 and 45 to elevate the suspending frame and scraper blade. When the levers are again pushed forward the scraper blade is depressed with the suspending frame, and the levers are locked, together with the bracket arms 57, by the lever pawls and rack. The bushings 42 and 43 are now capable of rocking on the bar 38 within the hubs 57' when the hand wheels are turned to adjust the scraper blade in its desired relation to the road surface.

The engagement of the worms with their worm gears locks the suspending frame against vertical movement, and by using the weights 15, or in other manner loading the scraper blade, the blade is prevented from jumping, thus eliminating any strains that might otherwise be transmitted to the frame of the machine.

Having thus fully described my invention what I claim as new and desire to secure by Letters Patent is—

1. In an implement as described the combination with a supporting bar, of a crank-bushing thereon, a bracket-arm having a loose hub on said bushing and a bearing bracket on said arm, a worm shaft journaled in said bracket and a worm on the shaft, a worm gear for co-action with said worm and a hub on said gear rigidly connected with the bushing.

2. In an implement as described the combination with a supporting bar of a crank-bushing thereon and a worm gear fixed to said bushing, a bracket arm having a hub loose on said bushing, a lever rigid with said hub, a shaft journaled in said bracket arm, and a worm on said shaft engaging said worm gear.

In testimony whereof I affix my signature.

JAMES B. JARMIN.